United States Patent [19]

Lazes

[11] Patent Number: 4,536,964
[45] Date of Patent: Aug. 27, 1985

[54] PIPE THREAD GAUGE

[76] Inventor: Richard J. Lazes, 2748 Orchid St., New Orleans, La. 70119

[21] Appl. No.: 535,216

[22] Filed: Sep. 23, 1983

Related U.S. Application Data

[63] Continuation-in-part of Ser. No. 430,586, Sep. 30, 1982.

[51] Int. Cl.³ .................................................. G01B 3/40
[52] U.S. Cl. ................................. 33/199 R; 33/143 M; 33/147 M; 33/531; 33/169 B
[58] Field of Search ............. 33/174 E, 199 R, 174 L, 33/143 M, 143 J, 143 L, 147 M, 169 B

[56] References Cited

U.S. PATENT DOCUMENTS

| | | | |
|---|---|---|---|
| 1,335,004 | 3/1920 | Lehigh | 33/165 |
| 2,874,475 | 2/1959 | McGaffey | 33/174 E |
| 3,090,126 | 5/1963 | Kernoski | 33/199 R |
| 4,189,843 | 2/1980 | Baldwin | 33/199 R |
| 4,238,885 | 12/1980 | Lendi et al. | 33/143 M |

Primary Examiner—Willis Little
Attorney, Agent, or Firm—George A. Bode

[57] ABSTRACT

A pipe thread gauge for measuring the pitch diameter of threaded pipe and determining the taper on the inner and outer sides of the threaded ends of the pipe comprising: an elongated rail, a fixed blade block assembly mounted on the rail, a second blade block assembly slidably mounted on the rail and movable relative to the fixed blade block assembly, thread-engaging blades mounted on both the fixed and sliding blade block assemblies, set screws mounted in the second blade block assembly for engaging apertures provided in the rail at selected locations therealong for locking the slidable blade box assembly at such locations, and a digital readout to visually display measurements of pitch diameter and/or taper.

12 Claims, 4 Drawing Figures

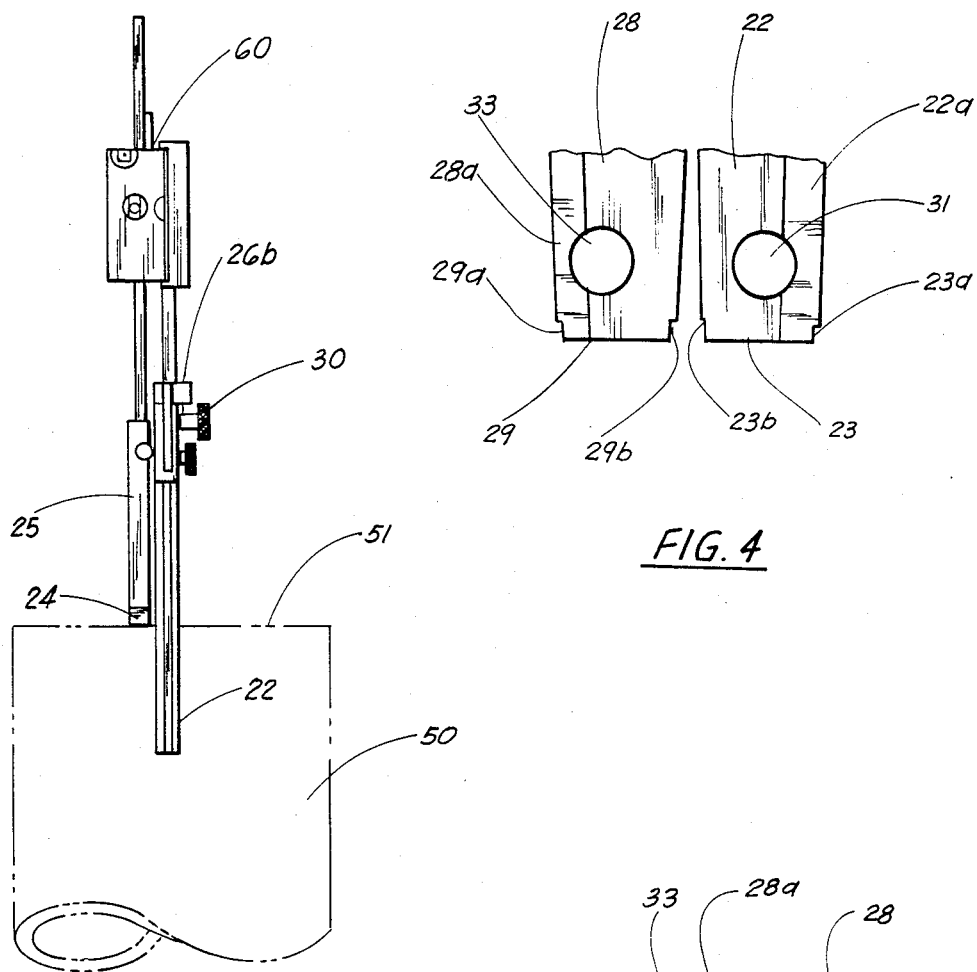
FIG. 4
FIG. 2
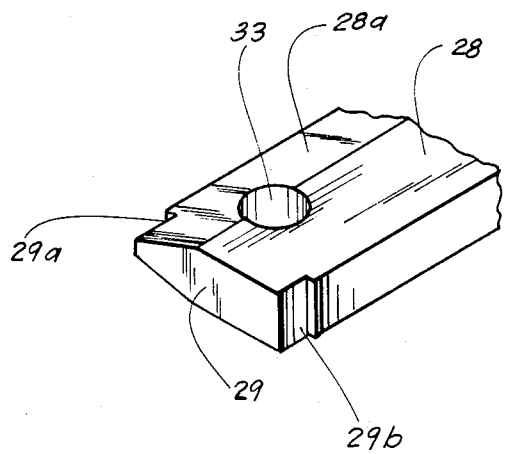
FIG. 3

PIPE THREAD GAUGE

This application is a continuation-in-part of applicant's co-pending U.S. application Ser. No. 430,586, filed Sept. 30, 1982, entitled "Method of Field Inspecting Pin and Box Ends of Oil Field Casings and Pipes and Simultaneously Recording Inspection Results in a Permenant Medium".

BACKGROUND OF THE INVENTION

1. Field of the Invention

The present invention relates to apparatus for gauging or measuring certain physical properties of the threading placed on the ends of tubular devices, and, more particularly, to an apparatus for measuring the pitch diameter of threaded pipe ends for determining the taper of threads on the inner or outer sides of the ends of tubular members.

2. General Background

In the oil and gas production industry, string of tubing sections of threaded pipe are joined end-to-end, i.e., pin to box end, to convey fluids. It is desirable that the joints be strong and of tight fit although not excessively tight. To obtain proper mating, pitch diameter and taper of the threading of the pin and box ends must be standardized. Such standard specifications for pitch diamter, taper and "stand-off" (the distance from the end of the threaded pipe to the plane for measuring the pitch diameter) are promulgated by the American Petroleum Institute (API). To check for conformity, gauging procedures have been standardized and various gauging devices exist for use in field locations. Some prior art patents illustrating such gauges and gauging techniques are disclosed in the following U.S. Patents:

| U.S. Pat. No. | Inventor |
| --- | --- |
| 4,189,843 | Baldwin |
| 2,874,475 | McGaffey |
| 3,432,935 | Reish |
| 2,852,856 | Cox |
| 2,668,359 | Litchfield |
| 1,950,912 | Aronson |

Such a pipe thread gauge permitting field measurement of pitch diameter and taper of pipe threads for sorting drill pipe to match pin and box ends carried on pipe so that properly interfitting joints are realized includes an elongated scale rail having a pair of blade block assemblies slidably mounted on the rail and thus movable relative to each other and a pair of thread engaging blades pivotally supported on the blade blocks to adjust the angle at which the blades extend relative to each other is described in McGaffey. This gauge, while it can measure the taper of a thread course on the end of a pipe and the end diameter, cannot measure the pitch diameter of the thread and thus cannot measure the "stand-off" between the pin and box ends, important to the joint's tightness.

Baldwin provides a thread gauge of the type describe in McGaffey, but, capable of gauging the pitch diameter and taper of threads by further providing locking and adjusting elements in combination with the slidable blade blocks for locking the blades in fixed spacial relationship to each other along the length of the rail and a graduated scale bar and micrometer assembly on the rail for setting the distance which separates the blades so that a predetermined pitch diameter can be identified on a threaded pipe by placing the blades in contact with the crest of the threads over the length of the taper at opposite sides of the pipe end which carries the thread. Baldwin further provides a series of interchangeable blade stop plates for setting the blades at preselected angles to each other to correspond to specific thread taper dimensions to be gauged.

Also, in applicant's co-pending U.S. application Ser. No. 430,586, filed Sept. 30, 1982, entitled "Method Of Field Inspecting Pin And Box Ends Of Oil Field Casings And Pipes And Simultaneously Recording Inspection Results In A Permanent Medium", a digital LED readout means to display caliper measurements of pitch diameter, out-of-round, and taper of both pin and box threaded ends of pipe and casing sections is disclosed.

BRIEF DESCRIPTION OF THE PRESENT INVENTION

The present invention is directed to a pipe thread gauge for measuring the pitch diameter of threaded pipe and determining the taper on the inner and outer sides of thread ends of the pipe which includes an elongated rail, a fixed blade block assembly mounted on the rail, a second blade block assembly slidably mounted on the rail and movable relative to the fixed blade block assembly, thread-engaging blades mounted on both the fixed and sliding blade blocks, means for locking the slidable blade block assembly at selected locations along the rail and a digital read-out means to display measurements of pitch diameter and taper.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 2 is an end elevational view of the pipe thread gauge of the present invention viewed from the right end of the gauge as illustrated in FIG. 1.

FIG. 3 is an enlarged partial perspective view of the end portion of the thread-engaging blade of the slidable blade block assembly of the apparatus of the present invention.

FIG. 4 is an enlarged partial elevational view of the end portions of the thread engaging blades of the apparatus of the present invention.

DETAILED DESCRIPTION OF THE PREFERRED EMBODIMENT

Figure 1:
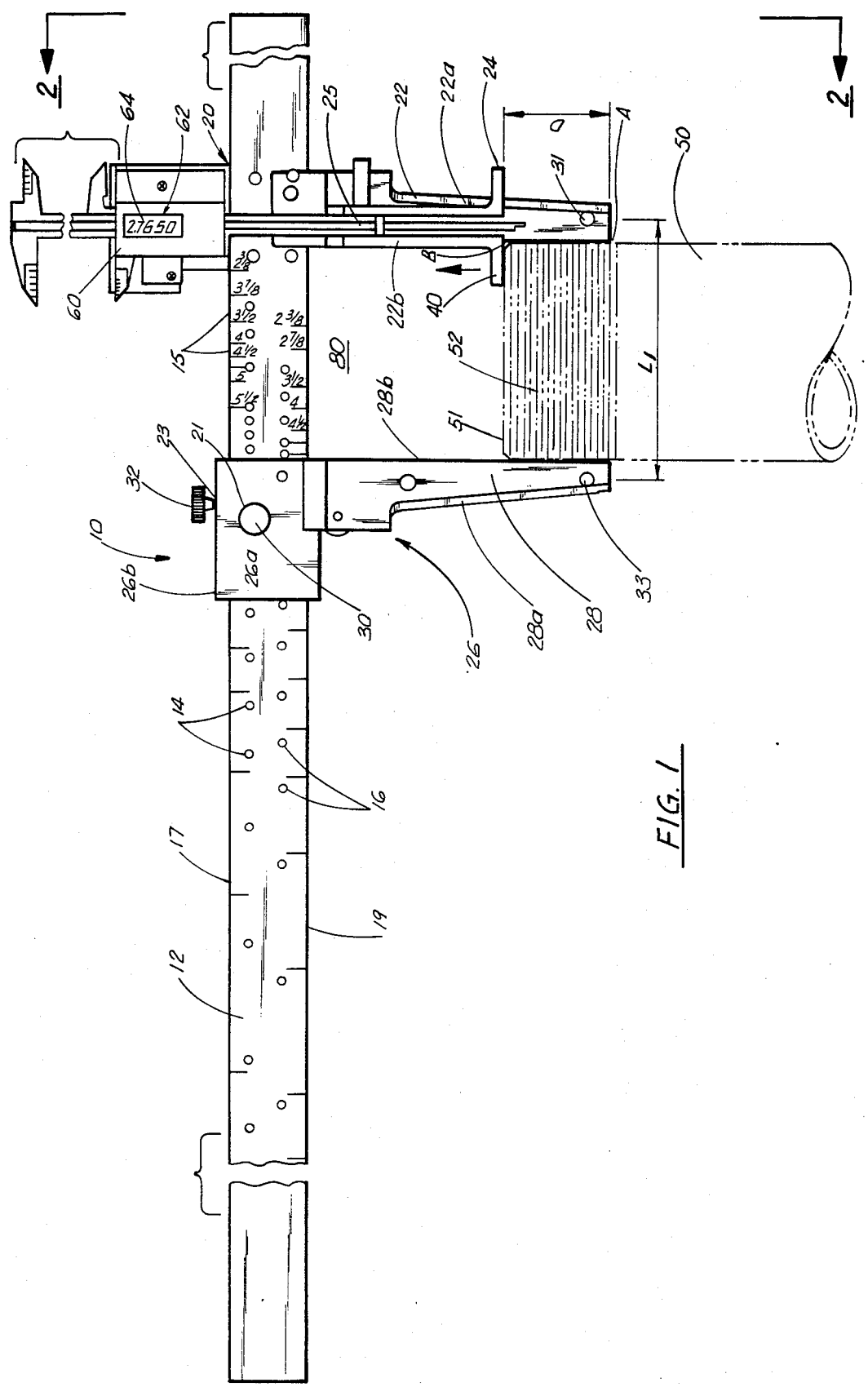
FIG. 1 is an elevational view of the preferred embodiment of the pipe thread gauge of the present invention.

The pipe thread gauge of the present invention, best illustrated in FIG. 1, is designated generally by the numeral 10. Gauge 10 includes an elongated scale rail or bar 12 provided with predetermined threaded apertures 14, 16 spaced therealong and provided parallel to each of the rail 12's edges 17,19 respectively and set off a distance therefrom. Apertures 14 correspond to differing outside pipe diameters of threaded pipe to be gauged and apertures 16 correspond to differing inside pipe diameters of the same. Each of apertures 14, 16 are provided with corresponding indicia 15 comprised of markings and numerals between each of apertures 14,16 and its corresponding edge 17,19 to indicate such inside and outside diameters respectively.

Fixedly mounted upon rail 12 and near one of its ends is a fixed blade block assembly 20. Also, slidably mounted upon rail 12 and movable therealong relative to fixed blade block assembly 20 is slidable blade block assembly 26 which has a pair of threaded apertures 21,23 provided respectively in surface 26a parallel to surface 13 of rail 12 and surface 26b parallel to upper edge 17 of rail 12 so that set screws 30, 32 respectively can be extended therethrough and into engagement with surface 13 and edge 17 of apparatus 10. Set screw 30 which projects through its respective corresponding aperture 21 also extends through aligned apertures 14 formed in rail 12.

Thus it can be seen that by the tightening of set screws 30,32 slidable blade block assembly 26 can be fixed in its spacial relationship to fixed blade block assembly 20 thereby creating cavity or throat 80 for accepting pipe 50. Each of the predetermined apertures 14 corresponding to the different outside pipe diameters can be used to correlate the position of the respective blade block assemblies 20,26 to a particular indicia 15 along scale rail 12.

Blade block assemblies 20, 26 each have vertically extending thread-engaging portions 22, 28, respectively, which project below the lower edge 19 of rail 12. Blade portions 22, 28 extend substantially normal to the longitudinal axis of rail 12. Each thread-engaging blade portion 22, 28 of assemblies 20,26 are fixed in vertical relation to rail 12 and therefore, each other and cannot pivot about the horizontal axis as best seen in FIG. 2.

As best seen in FIG. 4, thread-engaging blade portions 22, 28 each have a pair of right angle notches 23a, 23b, and 29a, 29b, formed at opposite sides and the lower most ends thereof. The inner edge of each of the thread engaging blades 22, 28 is flat as illustrated in FIG. 3, and the outer edge of each of blades 22,28 taper to rather sharp, well-defined edges 22a, 28a respectively. The use of these outside blade edges 22a, 28a is best seen in FIG. 1 and further described herein. Near the upper end of each of the thread-engaging blades 22, 28 and proximate notches 23a, 23b and 29a, 29b, respectively, are apertures 31, 33 which project through the thickness of blades 22, 28 respectively, as best illustrated in FIG. 3. These apertures 31, 33 provide means for calibrating gauge 10 and more specifically Vernier caliper assembly 24. In short, standard API tables are checked for error tolerances and converted to a lineal factor and added to length L1, the distance between the center points of apertures 31, 33.

As best seen in FIGS. 1 and 2, mounted on fixed blade block assembly 20 and thread-engaging blade 22 is vernier caliper assembly 24 having a slidable member 40 which projects substantially normal to blade member 22, and thus substantially parallel to rail 12, and can selectively engage the end 51 of pipe 50. Mounted on blade block 20 and electrically connected to caliper assembly 24 is a conventional digital LED readout means 60 which displays by display means 62 caliper measurements of thread length for calculating the pitch diameter, out-of-round condition and "taper" of the threaded portion of threaded pipe 50 to be measured. The digital LED read-out means can be of a conventional type such as DIGICAL, a product of Brown & Sharp of Precision Park, North Kingston, R.I. Movement of caliper assembly 24 (after being "zeroed" as described hereinabove for reference Point A) along blade 22 until edge member 40 of caliper 24 engages end 51 of threaded pipe 50 provides at display means 62 a digital read out of the distance D between Points A and B on the threaded portion of pipe 50 for the purpose of locating the end 51 of pipe 50 at Point B with respect to the end of blade 22 at Point A. The distance D from the end of blade 22 at Point A to the end 51 of pipe 50 at Point B is the "stand-off". From this and the thread diameter measured by indicia 15 on rail 12, the actual pitch diameter and out-of-round condition can be readily calculated since the distance L1 is known. Actual "taper" cannot and need not be measured; the "taper" referred to herein is the average diameter changed of the threaded portion of pipe 50 over thread length D.

In operation, the pipe thread gauge 10 of the present invention can be used to determine whether threaded pipe conforms to specific standards in its threading, i.e. taper and pitch diameter of the thread. In order to determine whether the threaded pipe conforms to API standards, the pipe thread gauge of the present invention is used to compare the pitch diameter actually present on a section of pipe to be gauged to the standard pitch diameter and also to gauge and compare the thread taper with the standard thread taper. By these measurements, the stand-off and "axial draw" of the gauged pipe or casing section will be proper to assure correct joint tightness.

To begin with, the desired standard taper can be set up on gauge 10 by selecting a slidable blade block assembly 26 with a thread engaging blade 28 fixed spacially with respect to blade 22 by placing screw 32 in one of apertures 14 which correspond to the outside diameter of pipe 50 to be measured. Thus the angle between blades 22 and 28 as they diverge from each other in a direction normal from scale rail 12 towards the outer end of the blades conform precisely to the standard taper specified in API Standards and Tables. The error factor is allowed for by the calibration technique involving apertures 31, 33 discussed above. With the pre-set angle of blade 28 relative to scale rail 12 and fixed blade 22, the need to determine pivot angle as provided for in the McGaffey and Baldwin patents is eliminated and no knowledge of trigonometric functions is needed by the operator in the field. Further, no part is necessary to limit any pivotal movement of the blades, such as Baldwin's stop plates (112,114). Thus the total angulation required is created between fixed blade 22 which is substantially normal to rail 12 and blade 28 which is at a pre-selected angle for the specific pipe 50 selected. Thus a series of slidable blade block assemblies 26 with thread-engaging blades 28 can be provided which are precisely dimensioned and configured to provide a series of standards to be used in setting predetermined thread taper standards into the angulated blade pairs. Each blade block assembly 26 and fixedly attached thread engaging blade 28 can be readily provided on scale rail 12 and pre-set by engaging screw 30 in selected aperture 14 and just as easily removed from rail 12 by the loosening of screw member 30 from engagement with any of the apertures 14 and removal from rail 12 and substitution of another pre-selected blade block assembly 26 and blade 28.

Because many varying and different embodiments may be made within the scope of the inventive concept herein taught, and bacause many modifications may be made in the embodiments herein detailed in accordance with the descriptive requirement of the law, it is to be understood that the details herein are to be interpreted as illustrative and not in a limiting sense.

What I claim as invention is:

1. A pipe thread gauge comprising:
   a. an elongated rail;
   b. first blade block assembly fixedly mounted on said rail and having a first thread-engaging blade fixedly connected thereto, said blade extending substantially normal to said rail;
   c. second blade block assembly slidably mounted on said rail for longitudinal sliding movement therealong;
   d. means for locking said second blade block assembly at selected locations along said rail;
   e. second thread-engaging blade fixedly connected to said second blade block assembly and set at a selected angle to said first thread-engaging blade thereby defining an open throat capable of receiving the threaded end of said pipe; and
   f. means slidable along said first blade block assembly for engaging said end of the threaded end portion of said pipe for visually indicating the length occupied by the threads on said threaded end portion of said pipe, wherein said visual indicating means provides a digital read-out of said length.

2. The apparatus of claim 1 wherein said first and second thread engaging blades further comprise:
   a. relatively blunt edges interior of said open throat; and
   b. relatively sharp edges exterior of said open throat.

3. The apparatus of claim 1 wherein said means for locking said second blade block assembly at selected locations along said rail comprises:
   a. apertures provided in said rail at selected locations therealong; and
   b. means threadably mounted in said second blade block assembly for engaging said apertures.

4. The apparatus of claim 3 wherein said means for engaging said apparatus are set screws extending through said rail.

5. A pipe thread gauge comprising:
   a. an elongated rail;
   b. first blade block assembly fixedly mounted on said rail and having a first thread-engaging blade fixedly connected thereto, said blade extending substantially normal to said rail;
   c. second blade block assembly slidably mounted on said rail for longitudinal sliding movement therealong;
   d. means for locking said second blade block assembly at selected locations along said rail;
   e. second thread-engaging blade fixedly connected to said second blade block assembly and set at a preselected angle to said first thread engaging blade, thereby defining an open throat capable of receiving the threaded end portion of a pipe; and
   f. means slidable along said first blade block assembly for engaging said end of the threaded end portion of said pipe for visually indicating the length occupied by the threads on said threaded end portion of said pipe, wherein said visual indicating means provides a digital read-out of said length;
   g. said first and second thread-engaging blades further comprise relatively sharp edges exterior of said throat.

6. The apparatus of claim 5 wherein said visual indicating means provides a digital read-out of said length occupied by the threads of said threaded end portion of said pipe.

7. The apparatus of claim 5 wherein said first and second thread-engaging blades further comprise relatively blunt edges interior of said throat.

8. The apparatus of claim 5 wherein said said first and second thread-engaging blades further comprise relatively blunt edges interior of said throat.

9. The apparatus of claim 5 wherein said means for locking said second blade block assembly at selected locations along said rail comprises:
   a. apertures provided in said rail at selected locations therealong; and
   b. means threadably mounted in said second blade block assembly for engaging said apertures.

10. The apparatus of claim 9 wherein said means for engaging said apertures are set screws extending through said rail.

11. A pipe thread gauge comprising:
    a. an elongated rail;
    b. first blade block assembly fixedly mounted on said rail and having a first thread-engaging blade fixedly connected thereto, said blade extending substantially normal to said rail;
    c. second blade block assembly slidably mounted on said rail for longitudinal sliding movement therealong;
    d. means for locking said second blade block assembly at selected locations along said rail including apertures provided in said rail at selected locations therealong and means threadably mounted in said second blade block assembly for engaging said apertures;
    e. second thread-engaging blade fixedly connected to said second blade block assembly and set at selected angles to said first thread-engaging blade thereby defining an open throat capable of receiving said threaded pipe end; and
    f. means slidable along said first blade block assembly for engaging said end of the threaded end portion of said pipe for visually indicating the length occupied by the threads on said threaded end portion of said pipe.

12. The apparatus of claim 11 wherein said visual indicating means provides a digital readout of the length occupied by the threads on said threaded end portion of said pipe.

* * * * *